Sept. 1, 1959  R. DIENER  2,901,917
APPARATUS FOR POSITIONING A STOP OR OTHER PART
OF A MACHINE, MORE PARTICULARLY A MACHINE TOOL
Filed June 10, 1957  2 Sheets-Sheet 2

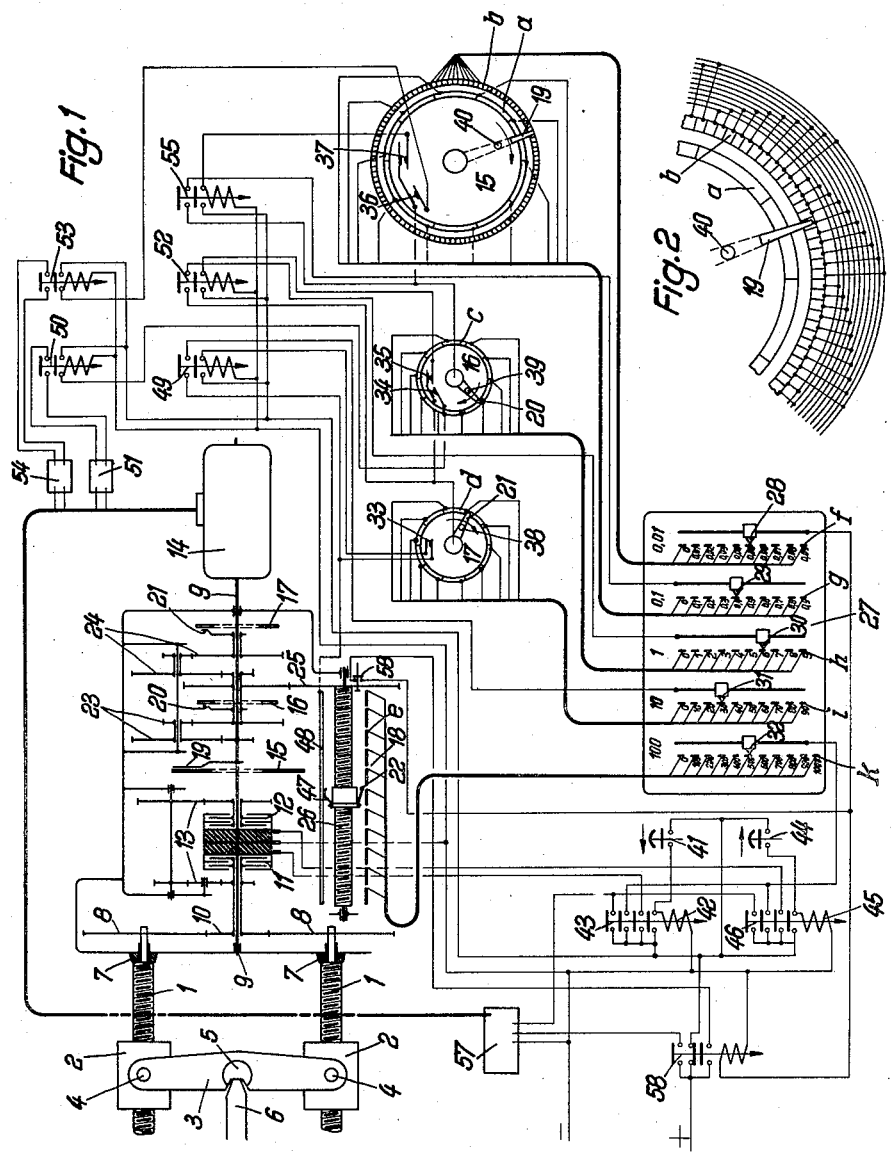

Inventor:
R. Diener

United States Patent Office 2,901,917
Patented Sept. 1, 1959

2,901,917

APPARATUS FOR POSITIONING A STOP OR OTHER PART OF A MACHINE, MORE PARTICULARLY A MACHINE TOOL

Richard Diener, Berlin-Hermsdorf, Germany, assignor to Berliner Maschinenbau-Actien-Gesellschaft vormals L. Schwartzkopff, Berlin, Germany Application June 10, 1957, Serial No. 664,825

Claims priority, application Germany June 15, 1956

8 Claims. (Cl. 74—472)

This invention relates to an apparatus for automatic adjustment, in accordance with preselection, of a machine part, more particularly on machine tools. This application is a continuation-in-part of Patent Application No. 434,907, now Patent 2,826,087, dated March 11, 1958.

This invention relates to adjusting apparatus or a servo motor device for machine-tools in which a tool-holder or a workpiece-carrier must be placed with a high degree of precision from one working position to another. Accordingly, the adjusting apparatus includes a counting mechanism associated with a rotatable shaft or the like, so that, for any operation utilizing the shaft such as moving a nut along threads on the shaft the number of revolutions of the shaft may be exactly controlled down to a small fraction of one revolution to thereby precisely locate and control the movement of the nut.

Accordingly, the present invention has for an object to provide an improved automatic adjusting apparatus of the type referred to, including a combined shaft rotation counting and shaft rotation controlling switching mechanism operatively electrically connected with a pre-selector unit to make possible greater precision in the adjustment of a driven component actuated in response to shaft rotation.

More particularly, the present invention has for an object to provide an improved structural relationship of the combined counting and switching mechanism.

Figure 3:
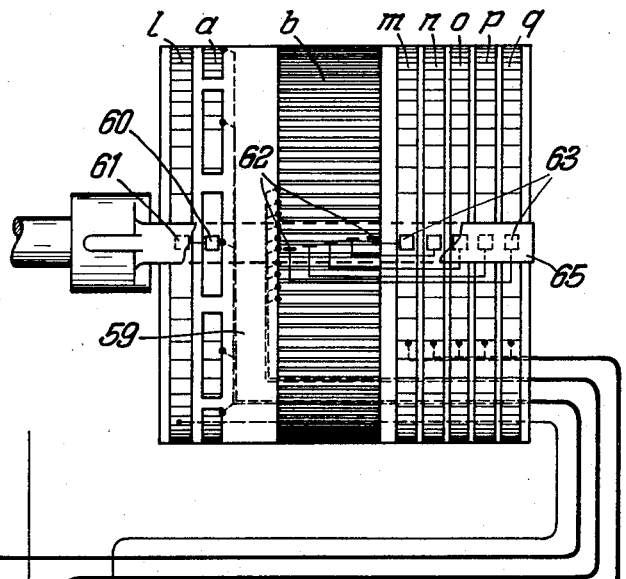
Figure 4:
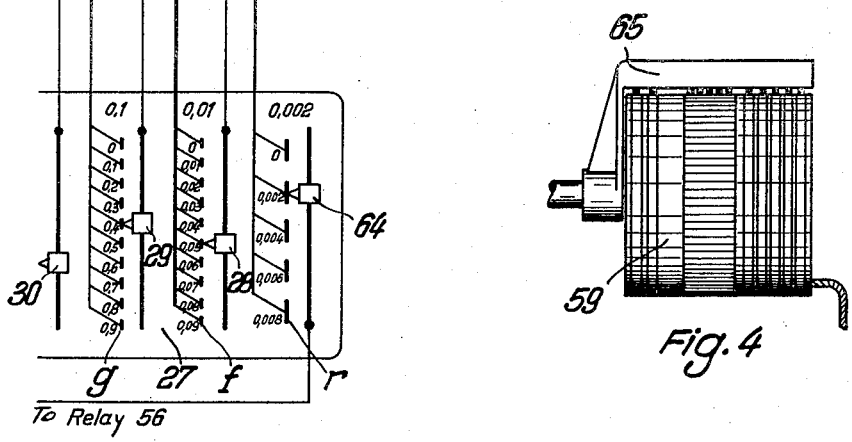

Further objects and advantages of the apparatus and of the improvement in accordance with the present invention will appear in the following description taken with the accompanying drawing in which the characters of reference refer to similar elements in the several views of the drawings, and in which:

Fig. 1 shows the general arrangement of an adjusting apparatus, and the electrical circuit thereof, Fig. 2 shows a fragment of the switching disc for fine adjustment on a larger scale, Fig. 3 shows a "collector," and a brush holder, and the electrical circuit thereof, in accordance with the improvement with which the present invention is principally concerned, and Fig. 4 is a side view of the contact carrier and the brush holder.

In Figs. 1 and 2 an embodiment of an adjusting apparatus is shown which automatically adjusts a stop 5, by means of two threaded spindles 1 with nuts 2 and a transverse bar 3, in accordance with preselection. The threaded spindles are rotated by a shaft 9 through the intermediary of gear wheels 8, gear wheel 10, magnetic couplings 11 and 12 and reversing gear 13. The reversing gear 13 and the magnetic couplings 11 and 12 are provided to permit the threaded spindles 1 to be rotated in either direction or disconnected from the shaft 9; this is necessary because the adjusting rotation of the shaft 9 takes place in only one direction. The shaft 9 which is directly coupled to a motor 14 also drives a counting and switching mechanism comprising contact discs 15, 16 and 17 and a contact rail 18, sliding contacts 19, 20, 21 and 22 sliding on said discs and rail respectively, reduction gearing 23, 24 and 25, and threaded spindles 26. The contact discs 15 to 17 and the contact rail 18 of the counting mechanism are stationary. Only the sliding contacts 19 to 22 sliding on the contact series are actuated by the shaft 9 through the reduction gearing 23 to 25 and threaded spindles 26. For the metric system of measurement, each of the contact discs 16 and 17 is provided with ten contacts. The contact disc 15 represents a combination of two contact discs, for adjustment to an accuracy of one-tenth and of one-hundredth of a revolution respectively, united to form a single member. The sliding contact 19 of the contact disc 15 is directly connected to the shaft 9, and the transmission ratio between the shaft 9 and the threaded spindles 1, and the thread pitch of the threaded spindles 1, are made such that one revolution of the sliding contact 19 corresponds to an adjustment movement of the stop 5 through one millimetre. For the metric system, the speed of rotation of the sliding contact 20 of the contact disc 16 is reduced to one-tenth of that of the sliding contact 19, by means of the reduction gearing 23. Therefore, one revolution of the sliding contact 20 is equivalent to ten revolutions of the shaft 9, corresponding to a movement of the stop 5 through ten millimetres, or the passage of the sliding contact 20 over one contact of the contact series $c$ is equivalent to a movement of the stop through one millimetre. The speed of rotation of the sliding contact 21 of the contact disc 17 is likewise reduced in the ratio 1:10 (to one-hundredth of that of the shaft 9) by the reduction gearing 24. Therefore, one revolution of the sliding contact 21 is equal to movement of the stop 5 thru one hundred millimetres, or the passage of the sliding contact 21 over one contact of the contact series $d$ of the contact disc 17 is equal to movement of the stop through ten millimetres. The reduction gearing 25, the pitch of the threaded spindle 26 and the interval between the contacts of the contact rail 18 are made such that the passage of the sliding contact 22 from the beginning of one contact to the beginning of the next one is equivalent to movement of the stop 5 through one hundred millimeters. The combined contact disc 15 has firstly a series containing ten contacts $a$, so that the passage of the sliding contact 19 from one contact of the series $a$ to the next one is equivalent to one-tenth of a revolution of the shaft 9, or equivalent to a movement of the stop 5 through one-tenth of one millimetre. On the disc 15, in addition to these contacts $a$ there is a second contact series $b$ containing one hundred contacts and divided into ten ten-contact groups, so that there is a ten-contact group of the contact series $b$ for each contact of the contact series $a$, as shown in part in Fig. 2. The contacts of the contact series $b$ are electrically connected in ten groups, in such a manner that all the first contacts of the ten-contact groups are connected with one another in a circle, and then all the second contacts, and then all the third contacts, and so on, as shown in part in Fig. 2. The sliding contact 19 slides on both contact series $a$ and $b$ (Fig. 2) and can establish connection between one contact of the contact series $a$ and one contact of the contact series $b$. For each contact on each contact disc 15 to 17 and on the contact rail 18 there is in a preselector 27 a contact which is electrically connected to the corresponding contact in the counting mechanism. The contacts in the preselector 27 are so grouped that for each of the contact discs 15 to 17 and for the contact rail 18 there is a corresponding contact series in the preselector. Contact series $f$, $g$, $h$ and $i$ in the preselector correspond to contact discs 15 to 17, and the contact series $k$ corresponds to the contact rail 18. In accordance with the movement of the stop 5 as described above, the contact series $f$, $g$, $h$, $i$ and $k$ in the preselector carry the following designations:

Contact series *f*—designation 0.01 mm. and 0 to 0.09 mm.
Contact series *g*—designation 0.1 mm. and 0 to 0.9 mm.
Contact series *h*—designation 1.0 mm. and 0 to 9.0 mm.
Contact series *i*—designation 10.0 mm. and 0 to 90.0 mm.
Contact series *k*—designation 100.0 mm. and 0 to 1000.0 mm.

In the preselector 27, sliding contacts 28 to 32, which are to be adjusted by hand according to the required amount of movement of the nuts 2, slide on the contact series *f* to *k*. In addition to the contact series, the contact discs 15 to 17 carry switches 33 to 37 which are actuated by cams 38 to 40 rotating with the sliding contacts.

In the improved apparatus constructed in accordance with Figs. 3 and 4, the contact disc 15 for adjustment to tenths and hundredths of a revolution (Fig. 2) is replaced by a "collector" 59, which, like the contact disc 15, carries the two contact series *a* and *b*. In addition to the contact series *a* and *b* the "collector" has six slip rings *l*, *m*, *n*, *o*, *p* and *q*. The contact series *a* and *b* of the "collector" are connected in exactly the same way as has been previously described in reference to the contact disc 15 and illustrated in Fig. 1. The contact series *b* is divided into ten-contact groups, and the first, second and third contacts and so on are connected with one another in a circle, exactly as described previously; the contact series *a* and *b* however are not bridged over by a sliding contact as before, but the contacts of the contact series *a* are bridged over to the slip ring *l* (Fig. 3) by sliding contacts 60 and 61 which are electrically connected. The slip ring *l* is itself connected to the sliding contact 28 of the contact series *f* in the preselector, so that the bridging-over of the contact series *a* to the contact series *b* is effected through sliding contacts 60 and 61 and the preselection switch of the contact series *f* in the preselector. In the Figs. 3 and 4 embodiment five narrow sliding contacts 62 slide on the contact series *b* of the "collector" 59; as previously described, the contact series *b* is connected exactly as in the case of the contact disc 15. The sliding contacts 62 are arranged in a row and at an inclination in such a manner that they divide the distance from the beginning of one segment to the beginning of the next segment of the contact series *b* uniformly according to the number of the sliding contacts 62. Each of the sliding contacts 62 is electrically connected to a respective sliding contact 63 sliding on a respective one of the slip rings *n* to *q*. The slip rings *n* to *q* are each connected to a respective contact of a contact series *r* in the preselector 27, on which series a sliding contact 64 is displaceable by hand. The sliding contacts 60 to 63 are carried by a brush holder 65 which rotates about the "collector" 59 which is stationary. The "collector" 59, the brush holder 65 and the arrangement of the sliding contacts 60 to 63 are shown again in Fig. 4.

The operation of the apparatus is as follows:

By actuation of a push-button 41 the relay 42 is supplied with current and closes the group of contacts 43. The relay 42 thereby receives holding current, so that even when the push button 41 is released the group of contacts 43 remains closed. Through the contacts of the contact group 43 the magnetic coupling 11 is closed and the shaft 9 and the switching and counting mechanism 15 to 26 are thereby connected to the threaded spindles 1.

Current is supplied to the counting mechanism and the motor 14 is set running in a certain direction of rotation. If it had been desired to move the stop 5 in the other direction, then the push button 44 should have been actuated, which through the relay 45 and the magnetic coupling 12 would initiate the abovementioned operation in the opposite direction of movement. In the present example, the measurement 536.45 mm. is set on the preselector 27 in Fig. 1, and 0.002 mm. is set on the contact series *r* in Fig. 3. By actuation of the push button 41 the apparatus is set in operation, and the motor 14 first of all continues to run until the sliding contact 22 on the contact series *e* comes to the fifth contact, as preselected on the contact series *k* in the preselector. Through the closing of the circuit from the sliding contact 32 in the preselector, through the preselected contact of the contact series *k*, the contact of the contact series *e* connected to said preselected contact, and the sliding contacts 22 and 47 to the contact rail 48, current is supplied to the switch 33 of the contact disc 17. The cam 38 rotating with the sliding contact 21 is so arranged that it closes the switch 33 on completion of each revolution of the sliding contact 21, i.e. on completion of every hundred revolutions of the shaft 9. Since the switch 33 does not receive current from the current rail 48 until shortly before the completion of the five-hundredth revolution of the shaft 9, and the switch 33 is actuated by the cam 38 only once in every hundred complete revolutions of the shaft 9, the relay 49 does not receive current until the completion of the five-hundredth revolution of the shaft 9. Relay 49 then immediately receives holding current and, through the switched-on thirty-millimetre contact of the contact series *i* of the preselector, supplies current to the corresponding contact of the contact disc 17. On the contact disc 16 are two switches 34 and 35 which are closed by the cam 39 on completion of every tenth revolution of the shaft 9. The switch 34 is set forward by a distance determined by experiment. When the sliding contact 21 on the contact disc 17 reaches the contact preselected on the preselector and receiving current, current is supplied to the two switches 34 and 35 of the contact disc 16. When the switch 34 is actuated by the cam 39, the relay 50 receives current and by suitable means reduces the speed of rotation of the shaft 9 to 500 r.p.m. through the intermediary of the change-over switch 51. The switch 35 is closed by the cam 39 at the moment of completion of the 530th revolution of the shaft 9. The closing of the switch 35 causes the relay 52 to respond, to receive holding current and to supply current, through the six-millimetre contact of the contact series *h*, preselected on the preselector, to the corresponding contact of the contact series *c* on the contact disc 16. When the rotating sliding contact 20 reaches the contact to which current has been supplied, the two switches 36 and 37 receive current. Switch 36 is likewise set forward by a distance ascertained by experiment. When the stud 40 (in Fig. 1) on the rotating slide spring 19 closes the switch 36, which occurs at the instant of the completion of the 536th revolution of the shaft 9, relay 53 is switched on and, through a second change-over switch 54, reduces once more the speed of rotation of the shaft 9 to 6 r.p.m. The time now taken by the slide spring 19 in getting from one contact of the series *a* to the other amounts to 1 sec. The reduction of the speed of rotation of the shaft 9 to 6 r.p.m. must be completed when the stud 40 closes the switch 37. As a result of the closing of the switch 37, relay 55 is switched on which, through the one at the preselector preset contact 0.4 mm. of the contact series *g*, supplies current to the corresponding contact of the series *a* of the contact disk 15. When the slide spring 19 now runs above the charged contact of the series *a* it closes the circuit at that contact of the series *b* which corresponds to the contact 0.05 mm. preselected at the preselector 28 on the series *f* and the servo motor device has completed its operation.

For higher speeds of adjusting rotation, in order to avoid having to use, for adjustment to 1/100 of a revolution, a sliding contact that would have to rotate very rapidly, and in order nevertheless to obtain accuracy of adjustment down to one hundredth of a revolution, in the counting mechanism the contact disc for 1/100 of a revolution is combined with the contact disc for 1/10 of a revolution. By this expedient, accuracy of adjustment down to 1/100 of a revolution is obtained by means of a sliding contact rotating at only one tenth of the speed that would otherwise become necessary. If it were desired to increase the accuracy still further, the speed of rotation of the sliding contact would have to be made too great.

A further increase in the accuracy of the adjusting rotation is made possible by the improved apparatus shown in Figs. 3 and 4 which employs a wide "collector," that is to say a contact carrier formed in the manner of a cylindrical commutator, instead of a contact disc, for ⅒ and ¹⁄₁₀₀ of a revolution. The invention is characterised by narrow sliding contacts arranged, in a brush holder, in a row which is at an angle to the bars or segments of a "collector," said row extending from the beginning of one segment to the beginning of the next segment. Thus the contact path from segment to segment is further divided, and the contact-making of a series of segments is further multiplied, according to the number of sliding contacts in the row.

Thus, by an addition in accordance with the present invention the accuracy of adjustment of the last adjusting member—the member for hundredths of a revolution—of the counting mechanism is increased in accordance with the number of contacts used in the inclined row, without any need to increase the speed of rotation of the sliding contact (in the present embodiment, the rotating brush holder in Figs. 2 and 4).

In Figs. 3 and 4 the cam 40 which rotates with the brush holder 65 and not, as in Fig. 1, with the sliding contact 65 closes the switch 36, which occurs at the moment of the 536th revolution of the shaft 9, the relay 53 is switched on and further reduces the speed of rotation of the shaft 9 to 6 r.p.m. by means of the second changeover switch 54. By the closing of the switch 37, relay 55 is switched on and, through the 0.4-millimetre contact of the contact series g, selected in the preselector 27, supplies current to the corresponding contact of the contact series a of the "collector" 59. When the sliding contact 60 now slides over that contact of the series a to which current has been supplied, in accordance with the new circuit shown in Fig. 3, the sliding contact 28 in the preselector receives current and, through the 0.05-millimetre contact of the contact series f, supplies current to the corresponding contacts of the ten-contact groups of the contact series b of the "collector" 59. The brush holder 65 will now be able to continue to rotate only until that contact of the five sliding contacts which has been preselected in the preselector 27 by means of the sliding contact 64 on the contact series r (0.002-millimetre contact), touches that contact of the contact series b to which current is supplied.

Upon the closing of the final circuit preselected by sliding contact 28 or 64 the relay 56 is switched on and immediately the magnetic coupling and all relays are switched off, whereby the threaded spindles 1 are disconnected from the shaft 9 and from the counting mechanism, and no further current is supplied to the counting mechanism. At the same time, by means of a reversing switch 57 the direction of rotation of the motor is reversed so as to turn the counting mechanism 15 to 26, which is disconnected from the threaded spindles 1, to zero, which is determined by the end switch 58, whereby the apparatus is also brought to a standstill.

Owing to the fact that the sliding contacts 62 are arranged in a row disposed at an angle to the segments of the "collector" 59 in Figs. 3 and 4, the circuit by which the apparatus is brought to a standstill in this case is not closed on the same line with the first sliding contact 62. Since in the present example five sliding contacts 62 are provided, and this corresponds to a rotary movement, from one of the sliding contacts to another, of 0.01:5=0.002 revolutions, and since the 0.002-millimetre contact preselected on the contact series r in the preselector is the second one in the row, the brush holder 65 makes a further movement through 0.002 revolutions before the apparatus is brought to a standstill by the closing of the circuit.

What is claimed is:

1. Control means for a rotatable shaft including a drive shaft, a pair of magnetic clutches, engageable with said drive shaft, gear means between said clutches and said rotatable shaft to provide for rotation of said rotatable shaft in either direction, switch means for selective engagement of said clutches with said drive shaft whereby said rotatable shaft may be rotated in either direction, a plurality of slidable contact means for manual preselection of each digit of the number of revolutions and decimals thereof to be performed by said rotatable shaft regardless of the direction of rotation, and rotatable switch means having a normal setting of zero driven by said drive shaft, a network of conductors connecting said means for manual preselection with said rotatable switch means and to said pair of magnetic clutches, said rotatable switch means being divided into portions, each corresponding to at least one digit of the preselected number of revolutions and decimals thereof to be made by said rotatable shaft, relay means operable upon completion of said number of revolutions and decimals thereof to disengage said magnetic clutch means and to return said switch means to said normal setting of zero.

2. The device of claim 1 in which means are incorporated in at least one of said movable elements of said rotatable switch means that reduces the speed of rotation of said drive shaft as said one of said movable elements is activated.

3. The device of claim 1 in which one of said portions of said rotatable switch means corresponds to at least two consecutive digits of said preselected number of revolutions to be performed.

4. The device of claim 1 in which one of said portions of said rotatable switch means corresponds to three consecutive digits of said preselected number of revolutions to be performed.

5. The device of claim 4 in which said one of said portions of said rotatable switch corresponds to three consecutive digits comprises a stationary cylindrical collector means carrying stationary contacts and a rotating brush holder carrying a plurality of sliding contacts that contact the cylindrical surface of said collector means, and said stationary contacts, the portion of said cylindrical collector corresponding to the first of said digits comprising an annular stationary contact and a ring of ten segmental contacts, the portion of said rotating brush holder corresponding to the said first of said digits comprising a pair of interconnected brushes, the portion of said cylindrical collector corresponding to the second of said digits comprising an annular series of groups of contacts, and the porton of said cylindrical collector corresponding to said third of said digits comprising an annular contact for each said digit, sliding contact means on said brush holder to run on said annular contacts for each of said third of said digits, and circumferentially spaced sliding contacts corresponding and electrically connected one to each of said third of said digits said circumferentially spaced sliding contacts being equally spaced circumferentially to subtend an arc equal to the arcuate spacing of the centers of consecutive contacts of said contacts corresponding to said second digit.

6. The device of claim 1 in which said rotatable switch means includes 100 equally spaced annularly arranged stationary contacts divided into ten groups of ten contacts, each corresponding to one said digit, and a plurality of annular contacts corresponding to the following digit to said one said digit concentric with said 100 spaced contacts, a plurality of first sliding contacts mounted for rotation, each said first sliding contacts contacting one of said annular contacts, and a plurality of second sliding contacts each electrically connected to one of said first sliding contacts, said second sliding contacts being so positioned as to contact said 100 equally spaced annularly arranged contacts, and said second sliding contacts being equally spaced circumferentially from each other a distance corresponding to the fraction unity divided by the number of said second sliding contacts of the center to center distance of said 100 annularly arranged contacts.

7. The device of claim 1 in which said rotatable switch means comprises a plurality of movable elements, each slidable over a plurality of contacts corresponding to the digits of the number of revolutions to be performed and means whereby said movable elements of said rotatable switch means are activated in sequence from the highest to the lowest digit of the preselected number of revolutions to be performed.

8. The device of claim 7, in which said plurality of movable elements of said rotatable switch means move at different speeds.

References Cited in the file of this patent
UNITED STATES PATENTS

| | | |
|---|---|---|
| 2,313,003 | Nougaou | Mar. 2, 1943 |
| 2,657,587 | Volk et al. | Nov. 3, 1953 |
| 2,672,067 | Hansell | Mar. 16, 1954 |
| 2,677,285 | Volk | May 4, 1954 |
| 2,826,087 | Diener | Mar. 11, 1958 |